(12) United States Patent
Batten, Jr.

(10) Patent No.: US 9,581,449 B1
(45) Date of Patent: Feb. 28, 2017

(54) FLOOR PATTERNS FOR NAVIGATION CORRECTIONS

(71) Applicant: George W. Batten, Jr., Houston, TX (US)

(72) Inventor: George W. Batten, Jr., Houston, TX (US)

( * ) Notice: Subject to any disclaimer, the term of this patent is extended or adjusted under 35 U.S.C. 154(b) by 0 days.

(21) Appl. No.: 15/005,399

(22) Filed: Jan. 25, 2016

Related U.S. Application Data

(60) Provisional application No. 62/108,004, filed on Jan. 26, 2015.

(51) Int. Cl.
 *G01C 21/10* (2006.01)
 *G01C 21/30* (2006.01)
 *G01C 21/20* (2006.01)
 *G01B 11/00* (2006.01)

(52) U.S. Cl.
 CPC ............ *G01C 21/20* (2013.01); *G01B 11/002* (2013.01)

(58) Field of Classification Search
 CPC ...... G01C 21/20; G01C 21/30; G01C 21/165; G01C 21/005; B60L 11/1846; G01S 5/0027; G05D 1/0265; B64F 1/20
 See application file for complete search history.

(56) References Cited

U.S. PATENT DOCUMENTS

| | | | | |
|---|---|---|---|---|
| 5,650,703 A * | 7/1997 | Yardley | ................ | G05D 1/0265 180/167 |
| 5,806,018 A * | 9/1998 | Smith | ................ | B60L 11/1846 340/988 |
| 6,081,231 A * | 6/2000 | Evans | ................... | G01S 5/0027 342/357.75 |
| 2009/0228204 A1* | 9/2009 | Zavoli | .................... | G01C 21/30 701/532 |
| 2011/0243454 A1* | 10/2011 | Miyajima | ............ | G01C 21/165 382/195 |
| 2012/0281503 A1* | 11/2012 | Rikoski | ................ | G01C 21/005 367/88 |
| 2016/0122038 A1* | 5/2016 | Fleischman | ............... | B64F 1/20 701/2 |

\* cited by examiner

*Primary Examiner* — Yuri Kan

(57) ABSTRACT

For a vehicle using dead reckoning or some other type of navigation which accumulates error as the vehicle moves, this invention provides a simple, single-sensor, low-cost, highly-accurate system for correcting navigation errors. The system uses a marker structure with optical density which is formed from one or more periodic patterns. The vehicle's navigation computer records the density, measured by the sensor, as the sensor moves on a line over a marker at a known location, then it processes the recorded density function to get the correct navigation parameters. If the vehicle's usual path passes over a marker, that path can be used without change for acquiring navigation corrections.

6 Claims, 7 Drawing Sheets

FLOOR PATTERNS FOR NAVIGATION CORRECTIONS

CROSS-REFERENCE TO RELATED APPLICATIONS

This patent claims the benefit of U.S. provisional patent No. 62/108,004 filed on Jan. 26, 2015, which is herein incorporated by reference.

| U.S. PAT. DOCUMENTS | | | | |
|---|---|---|---|---|
| 4,541,049 | September 1985 | Ahlbom | Method for updating in a wheeled vehicle steered by dead reckoning | 364/424.02 |
| 4,847,773 | July 1989 | van Helsdingen | System for navigating a free ranging vehicle | 364/443 |
| 5,111,401 | May 1992 | Everett | Navigational control system for an autonomous vehicle | 364/424.02 |

OTHER PUBLICATIONS

Odin, a robot for odometry, http://philohome.com/odin/odin.htm

Bong-Su Cho, Woo-sung Moon, Woo-Jin Seo and Kwang-Ryul Baek,
"A dead reckoning localization system for mobile robots using inertial sensors and wheel revolution encoding," Journal of Mechanical Science and Technology 25 (11) (2011) 2907 2917, Springer

STATEMENT REGARDING FEDERALLY SPONSORED RESEARCH OR DEVELOPMENT

Not applicable

REFERENCE TO A SEQUENCE LISTING, A TABLE, OR A COMPUTER PROGRAM LISTING COMPACT DISC APPENDIX

Not applicable

STATEMENT REGARDING PRIOR DISCLOSURE BY THE INVENTOR

There have been no prior disclosures by the inventor.

BACKGROUND OF THE INVENTION

Field of the Invention

This invention relates generally to methods for correcting dead-reckoning navigation errors in vehicles which can move past an area having a patterned position marker. In particular, the area can be on a horizontal floor, such as a warehouse floor or a table top; or it can be on a wall, a ceiling, or some other surface. The present invention describes a class of patterns to be used for markers, and methods that an autonomous robot or other vehicle can use to analyze the patterns for determining coordinates to be used for navigational corrections.

The purpose of this invention is providing a simple, single-sensor, low-cost, highly-accurate system for correcting navigation errors as a vehicle moves without changing direction along a dynamically variable path which crosses one or more two-dimensional patterned markers.

The Prior Art

Mobile robots commonly use odometry for position estimation. From wheel rotation measurements a robot can estimate its direction and travel distance along its path, and use those estimates to approximate its position. It is well known that this dead-reckoning navigation suffers from accumulation of errors, so the use of dead-reckoning for extended travel needs a method for correcting the estimated position. Many methods are known.

For example, a U.S. Pat. No. 4,541,049 by S. H. N. Ahlbom, et al. derives corrections using signals from a vehicle-mounted set of optical sensors arranged in a line as the vehicle crosses known-position lines on the floor. The present invention is simpler in that it uses a single optical sensor.

The robot known as "Odin" (reference: "Odin, a robot for odometry") uses a related method: the robot optically senses one leg of a known-position L-shaped pattern as it moves into the angle between the two legs, then it turns to cross and sense the other leg; it uses the positions sensed to determine its location. The present invention does not need to make large path direction changes to get the data necessary for navigation corrections.

U.S. Pat. No. 4,847,773 by C. C. van Helsdingen, et al. describes a grid of "passive" markers over which a sensor-equipped vehicle moves, but it does not describe markers with patterns similar to those of the present invention.

U.S. Pat. No. 5,111,401 by H. R. Everett, et al teaches the use of a stripe with position markers at various points; the robot moves until it encounters the stripe, then follows the stripe until it encounters a position marker, which it uses to establish its location by referring to predetermined coordinates of the position markers. The position markers are wider places on the stripe. The patent mentions that the "simplistic marker pattern" can be replaced with a more complex pattern providing unique identification of the marker, but it does not provide a detailed description of any such complex pattern. The present invention does not need stripe following, and it has complete descriptions of position markers.

BRIEF SUMMARY OF THE INVENTION

Overview

The key concept for this invention is the fact that Fourier analysis can reveal features of an object that is the superposition of periodic structures. The prototype for the patterned position marker is a finite, two-dimensional region, such as a circular disk, for which the optical density varies with position in a particular way. It will be apparent to persons familiar with the appropriate art that optical density is not the only characteristic which is appropriate, but using it here simplifies the description. Generally, the optical density will vary periodically in various directions; more precise descriptions of this are given below. For simplicity, in the following the term marker will mean "patterned position marker."

A vehicle using this invention carries a sensor which measures an average optical density in a small region. The exact nature of the averaging is not important, and the size of the region is not important as long as it is small compared with the sizes of features of the marker pattern, but large enough to reduce signal noise to an acceptable level. As the vehicle moves the sensor reports the measured density to the navigation computer (henceforth, computer) of the vehicle. The computer stores a portion of the measured density as a function f(s) of distance s along the sensor's path, and uses that function to determine corrections of navigation errors. In the following, this function f is called the path-density function, and the term sensor refers to the density sensor just described.

Using Simple Patterns

Some Definitions

FIG. 1 shows a simple-pattern marker 1 with part of the path 2 of the sensor as the vehicle moves past the marker, the dashed parts indicating that the path is incomplete.

Capital letters are used for quantities related to markers, and lower case letters are used for quantities related to the sensor path. Boldface sans-serif letters are used for vectors and points. Thus, points on sensor path 2 are lower-case letters p, $p_1$, $p_2$, etc., whereas the pattern reference point $C_0 = <X_0, Y_0>$ on pattern axis 3 is upper case. For descriptions of specific notations, see TABLE 1: LIST OF SYMBOLS USED. Terms specific to this invention are italicized when defined, and shown in TABLE 2: LIST OF TERMS.

For the part of the path shown, the motion starts at point $p_1$, then goes through points $p_2$, $p_3$, $p_4$, and $p_5$, to $p_6$. The part of the path between $p_2$ and $p_5$ is a straight line aligned with unit direction-of-motion vector v. The point $p_2$ is the reference point for distance s (i.e., s=0 at $p_2$) on the straight segment of the sensor's path.

Simple-pattern marker 1 (see FIG. 1) is a circular disk of radius $R_0$ centered at $C_0$. Its optical density varies in the direction of unit orientation vector $I_0$, but is independent of position in the direction of unit vector $J_0$ orthogonal to $I_0$. The counterclockwise angles in radians from the x-axis to $I_0$ and $J_0$ are $\alpha_0$ and $\alpha_0+\pi/2$, respectively.

Within the marker, the optical density is given by the marker-density function F, which will appear as F(x, y) when it is necessary to show the x and y coordinates. At times it will be convenient to use the notation F(p), where p is the point with coordinates x and y. For a simple-pattern marker, F is a sinusoidal function of position in the direction of $I_0$. The distance between adjacent density peaks measured in the direction of $I_0$ is the wavelength $\Lambda_0$. The function is independent of position in the direction of $J_0$.

The function F has not been defined outside the circular disk of the marker, but the discussion which follows is simplified if F is extended to the entire x,y-plane. Therefore, let $F^+$ denote the function which, throughout the x,y-plane, is constant on lines parallel to $J_0$, and periodic in the direction of $I_0$; and equals F inside disk 1. The maxima of $F^+$ are on certain lines parallel to $J_0$.

Points $p_3$ and $p_4$ are the points at which path 2 intersects the boundary of 1. Line 3 is the pattern axis; it passes through $C_0$ and is parallel to the orientation vector $I_0$. The counterclockwise angle in radians between $I_0$ and v is $\theta_0$ satisfying $0 \leq \theta_0 < 2\pi$.

As the sensor moves along the straight-line path across the marker it will report a density which is sinusoidal with wavelength $\lambda_0$. If $\cos(\theta_0) \neq 0$, $\lambda_0$ satisfies $|\cos(\theta_0)|\lambda_0 = \Lambda_0$. The following discussion uses angular frequencies $\omega_0 = 2\pi/\lambda_0$ and $\Omega_0 = 2\pi/\Lambda_0$. Thus $$\omega_0 = |\cos(\theta_0)|\Omega_0. \tag{1}$$

In FIG. 1, there are 12 cycles of the density across the disk, so $\Lambda_0 = R_0/6$, and $\Omega_0 = 12\pi/R_0$. Values of $\Omega_0$ of about this size will be used in the figures, but practical applications will have much higher values of $\Omega_0$.

The density reported by the sensor is a function of x and y, but since it is measured on the sensor's path, the computer stores it as periodic samples of the path-density function f(s). On the part of the path intersecting disk 1

$$f(s) = a \cos(\omega_0 s + \psi_0) + b, \tag{2}$$

where a, b, and $\psi_0$ are constants with $b \geq |a|$ and $0 \leq \psi_0 < 2\pi$.

The function F(x, y) is anchored to the x, y-axes and $C_0$, but f(s) is not. Instead, v and $p_2$ determine its relationship to F(x, y), hence to the x, y-axes and $C_0$. Therefore, f(s) carries some information about where the path is located. The computer has approximate values $\tilde{p}_2$ and $\tilde{\theta}_2$ for $p_2$, and $\theta_0$, respectively. The angle $\tilde{\theta}_0$ determines a unit vector $\tilde{v}$ which is an approximation of v. The goal is to use f(s) to get $\hat{\theta}_0$ and $\delta_0$, the latter being the component of the displacement $\delta = \tilde{p}_2 - p_2$ in the direction of $I_0$. The method for this involves mathematical concepts described in the following.

Mathematics for Getting Position and Direction from Phase and Frequency

An expression for F(p) on the path between $p_2$ and $p_5$ will be obtained, then that will be related to f(s).

For a point p (e.g., on the sensor's path), let S(p) denote the signed distance (positive toward $I_0$) from $C_0$ to the orthogonal projection P of p onto line 3. The reader is reminded that since $I_0$ is a unit vector, the dot product $(p - C_0) \cdot I_0$ is the (signed) length of the projection of the line segment from $C_0$ to p onto line 3, and $\delta_0 = \delta \cdot I_0$, so $$P = C_0 + ((p - C_0) \cdot I_0) I_0,$$

and $$S(p) = (p - C_0) \cdot I_0. \tag{3}$$

The value of the function $F^+(p)$ at p is determined by S(p). Let $\phi_0$ be the phase at $C_0$, so $$F^+(p) = A \cos(\Omega_0 S(p) + \phi_0) + B, \tag{4}$$

where A and B are constants associated with the pattern. Usually, $B \geq |A|$ so that F(p) is always nonnegative.

Between $p_2$ and $p_5$ on the sensor's path, p is a function of s given by $p(s) = p_2 + sv$, so from equations (2) and (4), $$a \cos(\omega_0 s + \psi_0) + b = f(s) = F^+(p(s)) = A \cos(\Omega_0 S(p(s)) + \phi_0) + B, \tag{5}$$

which is true while p(s) is between $p_3$ and $p_4$.

An early part of the computer processing of f is removal of the DC component b by any well-known technique (high-pass filtering, finding the average value b and subtracting it from f, etc.). Thus, in the following, without loss of generality, b, and B will be taken to be zero. Also, it is obvious that the cosine amplitudes must be equal: a=A. Therefore, the cosine factors in equation (5) are equal:

$$\cos(\omega_0 s + \psi_0) = \cos(\Omega_0 S(p(s)) + \phi_0) \text{ for } p(s) \text{ between } p_3 \text{ and } p_4.$$

Since this is true over an extended interval of s, the arguments of the cosines are equal except for an additive multiple of $2\pi$ to account for the periodicity of the cosines. Thus, from equation (3), $$\omega_0 s + \psi_0 = \Omega_0 (p(s) - C_0) \cdot I_0 + \phi_0 - m 2\pi, \tag{6}$$

where m is an integer. In particular, since $p(0)=p_2$, for $s=0$ equation (6) is $$\psi_0 = \Omega_0(p_2 - C_0) \cdot I_0 + \phi_0 - m2\pi. \tag{7}$$

This can be rearranged and applied to the definition of $\delta_0$ to get $$\delta_0 = (\tilde{p}_2 - p_2) \cdot I_0 = (\tilde{p}_2 - C_0) \cdot I_0 + (\phi_0 - \psi_0 - 2\pi m)/\Omega_0. \tag{8}$$

Therefore, if $\psi_0$ and m can be found, any position can be partially corrected by subtracting $\delta_0 I_0$ from it. In particular, the partially-corrected $\tilde{p}_2$ is $\tilde{p}_2 - \delta_0 I_0$.

A single simple-pattern marker does not, by itself, provide enough information to determine m but there is a condition under which m can be computed. Rearrange equation (8) to get (since $\Omega_0 = 2\pi/\Lambda_0$)

$$m = \frac{1}{\Lambda_0}(\tilde{p}_2 - C_0) \cdot I_0 + \frac{1}{2\pi}(\varphi_0 - \psi_0) - \frac{\delta_0}{\Lambda_0}. \tag{9}$$

If $$|\delta_0| < \Lambda_0/2, \tag{10}$$

then m is the nearest integer to the right side of (9) with $\delta_0 = 0$; i.e., $$m = \text{Round}\left(\frac{1}{\Lambda_0}(\tilde{p}_2 - C_0) \cdot I_0 + \frac{1}{2\pi}(\varphi_0 - \psi_0)\right). \tag{11}$$

The restriction on $\delta_0$ is too severe for most applications. Markers comprising superposed patterns, described below, have much weaker restrictions.

The computer will have the following information about the marker: the coordinates $X_0$ and $Y_0$ of the marker reference point $C_0$, the orientation vector $I_0$, the angular frequency $\Omega_0$, and the phase $\phi_0$ at $C_0$. All of these values, collectively called the marker parameters, are determined at the time of installation of the position marker, then delivered to the computer.

Under condition (10), after $\psi_0$ has been found, the computer can use equation (11) to get m, then use m in equation (8) to get $\delta_0$. Then the corrected value of $\tilde{p}_2$ is $\tilde{p}_2 - \delta_0 I_0$.

After $\omega_0$ has been found, the computer can use it in equation 1 to put restrictions on the approximation $\tilde{\theta}_0$ to $\theta_0$. This does not work well when $|d \cos(\tilde{\theta}_0)/d\tilde{\theta}_0|$ is close to zero (i.e., when $\tilde{\theta}_0$ is close to 0 or $\pi$).

A given value of $\omega_0$ determines several values of $\tilde{\theta}_0$, however: if $\tilde{\theta}_0$ is a solution satisfying $0 < \tilde{\theta}_0 < \pi$, then each of $\pi + \tilde{\theta}_0$, $\pi - \tilde{\theta}_0$, and $2\pi - \tilde{\theta}_0$ is a solution. Nevertheless, if one of these values is close enough to the current value of $\theta_0$ it can be used for the revised value of $\tilde{\theta}_0$. Usually, this is the case if $\theta_0$ and $\tilde{\theta}_0$ are reasonably close to the same one of $\pi/4$, $3\pi/4$, $5\pi/4$, and $7\pi/4$. Therefore, it is best if the path crosses the marker with $\theta_0$ close to one of these values.

Getting the Frequency and Phase

The computer uses odometry to measure s and to estimate the sensor's position $\tilde{p}$ and direction of motion $\tilde{v}$ (at angle $\tilde{\theta}_0$). When it starts on the straight segment from $p_2$ to $p_3$ it stores $\tilde{p}$ as $\tilde{p}_2$, an approximation to $p_2$.

After the sensor has passed over the marker, the computer determines $\omega_0$ and $\psi_0$ by some means. In principle, the frequency $\omega_0$ and phase $\psi_0$ can be determined by finding the midlevel points of f, and doing some simple calculations. This is a poor method because it is relatively sensitive to random errors (e.g., optical noise from dirt or breaks in the density pattern).

Consider, instead, using the Fourier transform $\hat{f}(\omega)$ of the stored path-density function f. Since the complex representation of the cosine is $$\cos(\gamma) = \frac{1}{2}(e^{j\gamma} + e^{-j\gamma}),$$

where j is the imaginary unit ($j^2 = -1$), f(s) can be written (with b=0; see equation (2))

$$f(s) = \frac{a}{2}(e^{j(\omega_0 s + \psi_0)} + e^{-j(\omega_0 s + \psi_0)}), \tag{12}$$

so $\hat{f}(\omega)$ is zero except at two points:

$$\hat{f}_+ = cae^{j\psi_0} \text{ at } \omega = \omega_0,$$

and $$\hat{f}_- = cae^{-j\psi_0} \text{ at } \omega = -\omega_0, \tag{13}$$

where c is a positive constant determined by the form of the Fourier transform used.

Therefore, to get both $\omega_0$ and $\psi_0$, the computer can examine the values of $\hat{f}(\omega)$ for $\omega > 0$ to find the nonzero value at $\omega_0$, then evaluate $$\psi_0 = \arctan(Im(\hat{f}_+(\omega_0))/Re(\hat{f}_+(\omega_0))), \tag{14}$$

where Re(•) and Im(•) extract the real and imaginary parts, respectively.

It will be apparent to persons familiar with the appropriate art that since the computer stores discrete samples it should use the Discrete Fourier Transform (DFT) instead of the continuous-domain Fourier transform appearing in the discussion above. Application of the DFT is illustrated in FIGS. 2 and 3, which, for purposes of illustration, show functions with continuous lines instead of discrete points.

FIG. 2 shows path-related functions, and FIG. 3 shows features of corresponding DFTs. The function $\omega$ is the window function which multiplies the extended density function $f^+$ to produce the path-density function f that the sensor reports. FIG. 2 shows the wavelength $\lambda_0$ expressed in terms of the corresponding angular frequency $\omega_0$.

The functions $\hat{f}^+$ and $\hat{f}$, which are the DFTs of $f^+$ and f, respectively, are complex functions of $\omega$. For simplicity, FIG. 3 shows $|\hat{f}^+|$ and $|\hat{f}|$, the absolute values of these functions. The graphs of the functions and the discussion that follows have been simplified by ignoring the fact that the DFT might not be computed over the entire span from $p_3$ to $p_4$, or over an integral number of cycles of the function $f^+$.

Multiplication of functions implies convolution of their DFTs. In particular, $\hat{f}$ is the convolution of $\hat{f}^+$ and $\hat{\omega}$, the DFT of $\omega$. The latter is a multiple of a sinc function, so $|\hat{f}|$ is a multiple of the absolute value of a sinc function translated so its center is at $\omega_0$, as shown in FIG. 4. The width of the central peak is inversely proportional to the distance between $p_3$ and $p_4$.

The computer can use $|\hat{f}|$ to determine $\omega_0$, either from the position of the peak, or by determining the centroid of the function. The latter should be more accurate if certain precautions are taken, such as using only that part of the function in the central peak. After getting $\omega_0$, the computer can determine $\psi_0$ as indicated in equation (14).

Some details that will be apparent to persons familiar with the appropriate art have been omitted. The graphs in FIG. 4 are drawn as if the DC components of $f^+$ and f have been removed.

Since the method for determining the frequency and phase integrates measured values (by summation, through the DFT), the accuracy is better than that of methods that use single point measures. It is also much less sensitive to noise.

Using Multiple Simple Patterns

The method just described fails if the vector v is nearly orthogonal to $I_0$. One way to provide for complete correction is to have the sensor path pass across several markers. This is illustrated in FIG. 4, in which the sensor path 8 passes sequentially across markers 5, 6, and 7 as the sensor moves from $p_1$ to $p_6$. The patterns are rotated from each other, as indicated by the orientation vectors $I_1$, $I_2$, and $I_3$. Each of markers 5 and 7 provide coordinate corrections in the directions of their orientation vectors.

Marker 6 cannot be used for corrections because $I_2$ is nearly orthogonal to the direction of motion. It is easy to see that the corresponding path wavelength $\lambda_2$ is very large, and that only two full cycles of the density sinusoid are crossed, so the determination of $\lambda_2$ would not be accurate. Better rotations of the three markers can be found.

A main disadvantage of the arrangement of FIG. 4 is that the sensor path is restricted. As will be shown below, it is possible to construct a single marker by superposing several patterns of the type being used in FIG. 1 and FIG. 4.

DETAILED DESCRIPTION OF THE INVENTION

Figure 1:
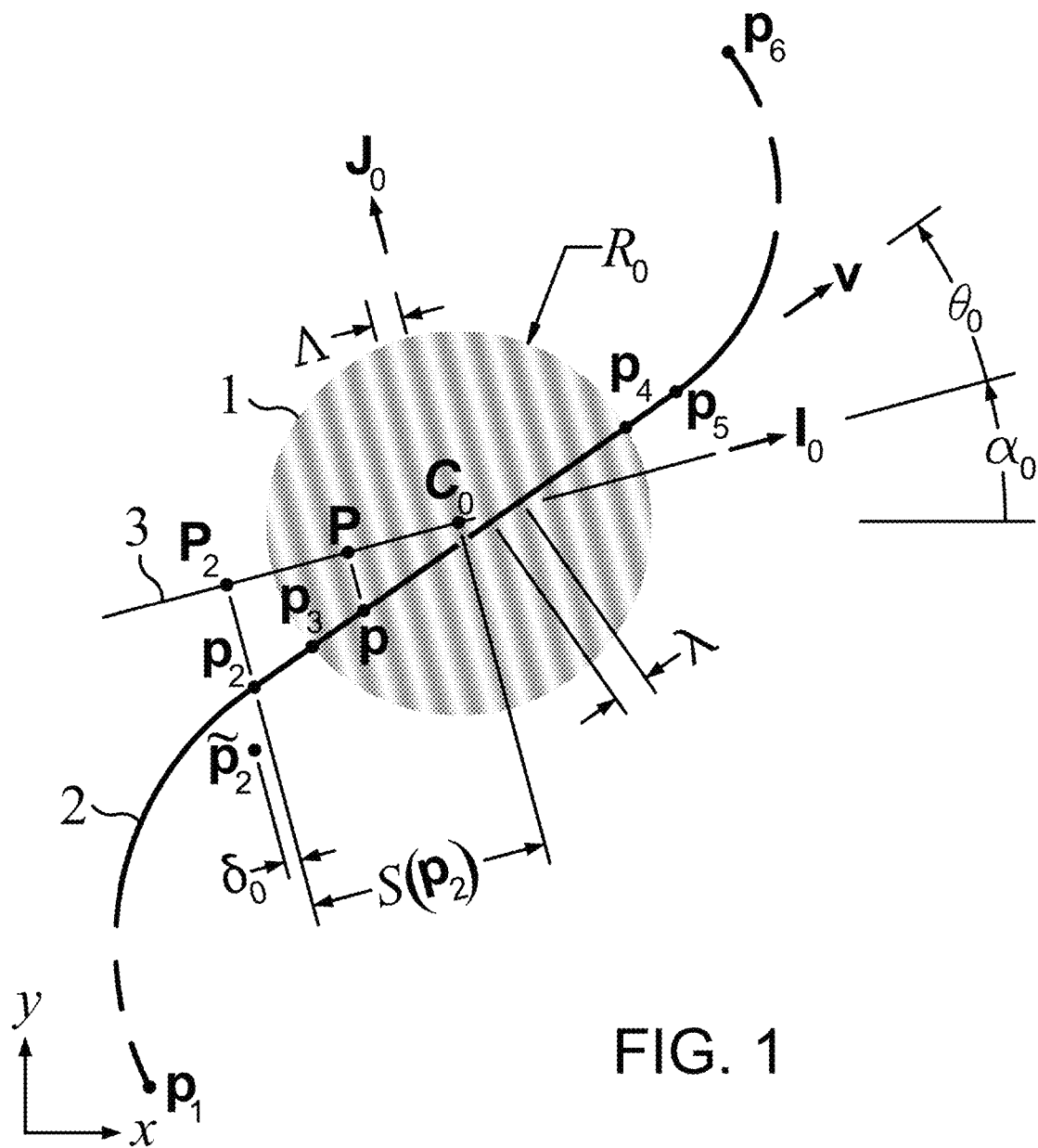
FIG. 1 shows a patterned position marker and the path of the density sensor passing over it.

This description is divided into several sections and it uses technical abbreviations, so the following lists are provided as an aid to the reader. Other than in Table 2, below, the first time an abbreviation is used, it is put in parentheses after its definition.

1. Tables

Table of Contents

1. TABLES
  TABLE OF CONTENTS
  TABLE 1: LIST OF SYMBOLS USED
  TABLE 2: LIST OF TERMS
2. SUPERPOSING ALIGNED PATTERNS
3. SUPERPOSING UNALIGNED PATTERNS
4. USING HIGH-CONTRAST MEDIA
5. OTHER CONSIDERATIONS

TABLE 1

LIST OF SYMBOLS USED
In this list k is the numerical index of a patterned position marker;
it can be blank; in some cases it can be a pair of indices.

| Symbol | Meaning |
|---|---|
| | Mathematical Notation |
| $\langle x, y \rangle$ | The point (or vector) with coordinate components x and y; e.g., $\delta = \langle \delta_x, \delta_y \rangle$. |
| $\lceil \cdot \rceil$ | The ceiling function: $\lceil r \rceil$ is the smallest integer $\geq$ r. |
| Round | Round to the nearest integer, ties rounding down: Round(u) = $\lceil u - \frac{1}{2} \rceil$. |
| $U \cdot V$ | For any vectors U and V, the dot product $U \cdot V = U_x V_x + U_y V_y$. |
| $k \in \{ \ldots \}$ | k is one of the members of the set $\{ \ldots \}$; e.g., $k \in \{1, 2, 3\}$ means k is 1,2, or 3 |
| | Symbols for the Patent |
| $\alpha_k$ | The angle between the positive x axis and the pattern orientation vector $I_k$. |
| $\delta_k$ | Offset in the direction $I_k$ of the estimated coordinates from the true coordinates. |
| $\theta_k$ | The counterclockwise angle in radians between $I_k$ and v with $0 \leq \theta_k < 2\pi$. |
| $\hat{\theta}_k$ | The computer's estimate of $\theta_k$. |
| $\lambda_k$ | Wavelength of the path-density function $f_k$. |
| $\Lambda_k$ | Wavelength of the pattern-density function $F_k(x, y)$. |
| $\phi_k$ | The phase of $F_k^+$ at $C_k$: $F_k^+ (C_k) = A \cos(\phi_k) + B_k$. |
| $\psi_k$ | Phase of $f_k(s)$ at $s = 0$. |
| $\omega_k$ | The angular frequency corresponding to $\lambda_k$ (thus, $\omega_k = 2\pi/\lambda_k$). |
| $\Omega_k$ | The angular frequency corresponding to $\Lambda_k$ (thus, $\Omega_k = 2\pi/\Lambda_k$). |

TABLE 1-continued

LIST OF SYMBOLS USED
In this list k is the numerical index of a patterned position marker;
it can be blank; in some cases it can be a pair of indices.

| Symbol | Meaning |
|---|---|
| f | The path-density function. |
| $f^+$ | The periodic extension of f to the entire s axis. |
| $\hat{f}$ | The discrete Fourier transform (DFT) of f. |
| s | The distance along the sensor path from $p_2$. |
| v | The direction-of-motion vector for the density sensor on the segment from $p_2$ to $p_5$. |
| $\tilde{v}$ | The computer's estimate of v. |
| $C_k$ | The pattern reference point $\langle X_k, Y_k \rangle$ of pattern k. |
| $I_k$ | The orientation vector of pattern k. |
| $J_k$ | The vector orthogonal to and on the left side of $I_k$. |
| $F_k$ | The pattern density function of pattern k. |
| $F_k^+$ | The periodic extension of $F_k$ to the entire x, y-plane. |
| $R_k$ | Radius of the position marker pattern (when circular). |
| $\delta$ | The displacement vector of $p_2$: $\delta = \tilde{p}_2 - p_2$. |
| p | A point on the sensor path, especially the sensor location. |
| $\tilde{p}$ | The computer's estimate of p. |
| $p_1$ | Starting point of the sensor path in the figures. |
| $p_2$ | Starting point of the straight path segment crossing a position marker; used as a reference point for s (s = 0 at $p_2$). |
| $p_4$ | Last point at which the straight path segment meets the position marker; |
| $p_5$ | Ending point of the straight path segment crossing the position marker; |
| $p_6$ | Ending point of the sensor path in the figures. |
| $P_k$ | The projection of p on pattern axis $I_k$ |
| $\tilde{p}_2$ | The computer's approximation of $p_2$. |
| S(p) | Distance from $C_0$ to P: $S(p) = (p - C_0) \cdot I_0$ |

TABLE 2

LIST OF TERMS

Figure 12:
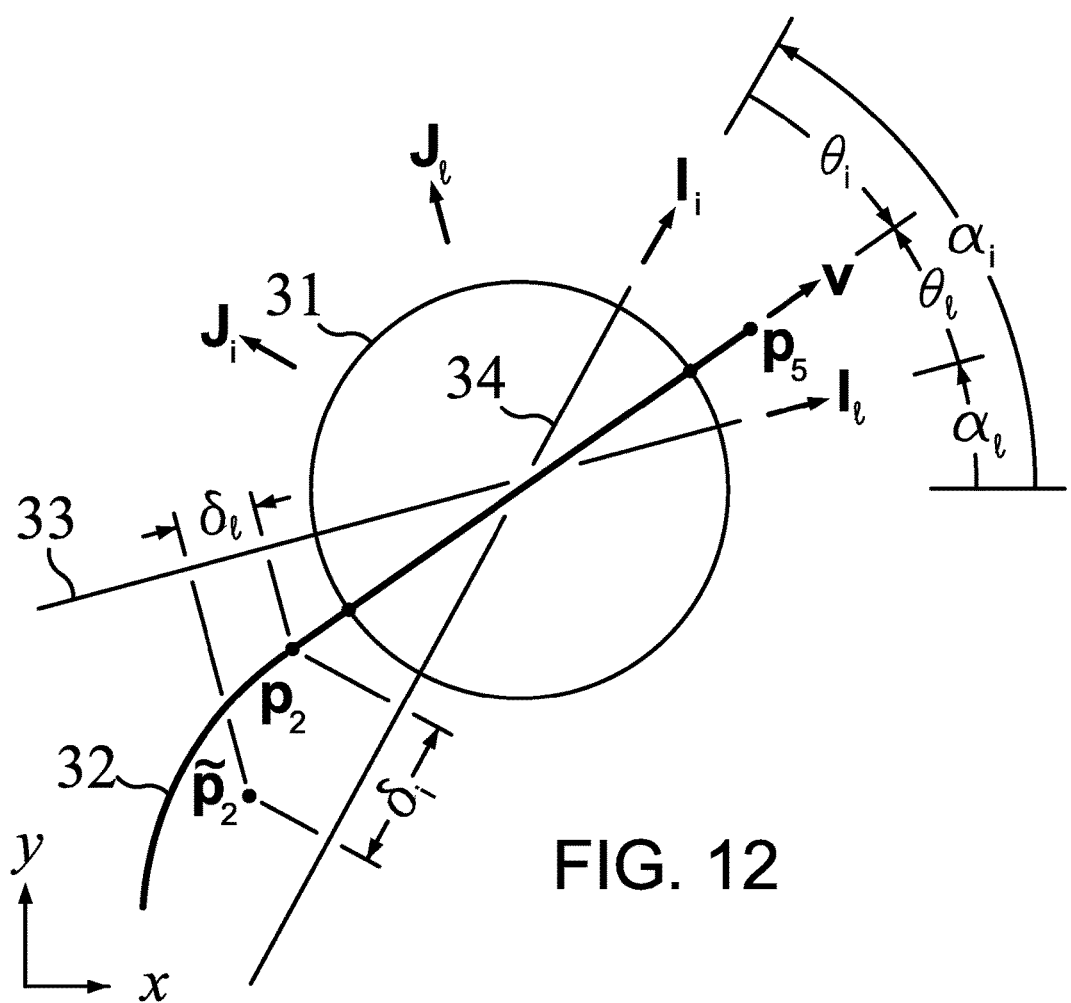
FIG. 12 displays the geometry of a marker comprising two patterns with different orientations.

| Paragraph | Term | Meaning, Example, Symbol, or Comment |
|---|---|---|
| 8 | marker | patterned position marker |
| 9 | sensor | optical density sensor |
| 9 | path-density function | f |
| 9 | computer | navigation computer |
| 11 | pattern reference point | $C_k$ |
| 11 | pattern axis | line 3 in FIG. 1; lines 33, and 34 in FIG. 12 |
| 12 | direction-of-motion vector | v |
| 13 | orientation vector | $I_k$ |
| 14 | pattern-density function | $F_k$ |
| 20 | displacement | $\delta$ |
| 27 | marker parameters | $X_k, Y_k, I_k, \Omega_k,$ and $\phi_k$ |
| 58 | underlying navigation | e.g., dead reckoning |
| 60 | superposing | $F_3 = A F_1 + B F_2 + C$ |

2. Superposing Aligned Patterns

No matter what form of navigation (called underlying navigation in the following), dead-reckoning or some other, is used to estimate the instantaneous position of the vehicle, operation of the vehicle must provide for the sensor to cross a position marker properly. Thus, the line from $p_2$ to $p_5$ must pass reasonably close to the center of the marker; within one-half of the radius of the marker may be sufficient.

As discussed above, for the geometry shown in FIG. 1, avoiding phase ambiguity requires the underlying navigation to insure that the orthogonal projection of $\tilde{p}_2$ on line 3 is within $\Lambda_0/2$ of the corresponding projection of $p_2$; i.e., that $|\delta| < \Lambda_0/2$. This reqirement is too severe in many applications.

The $|\delta| < \Lambda_0/2$ restriction can be relieved if there is a second marker pattern which provides for phase identification over a wider range. This can be done by superposing two or more patterns. The term superposing means combining the patterns by weighted addition of their density functions and adjustment of the DC component to produce the final pattern.

Figure 5:
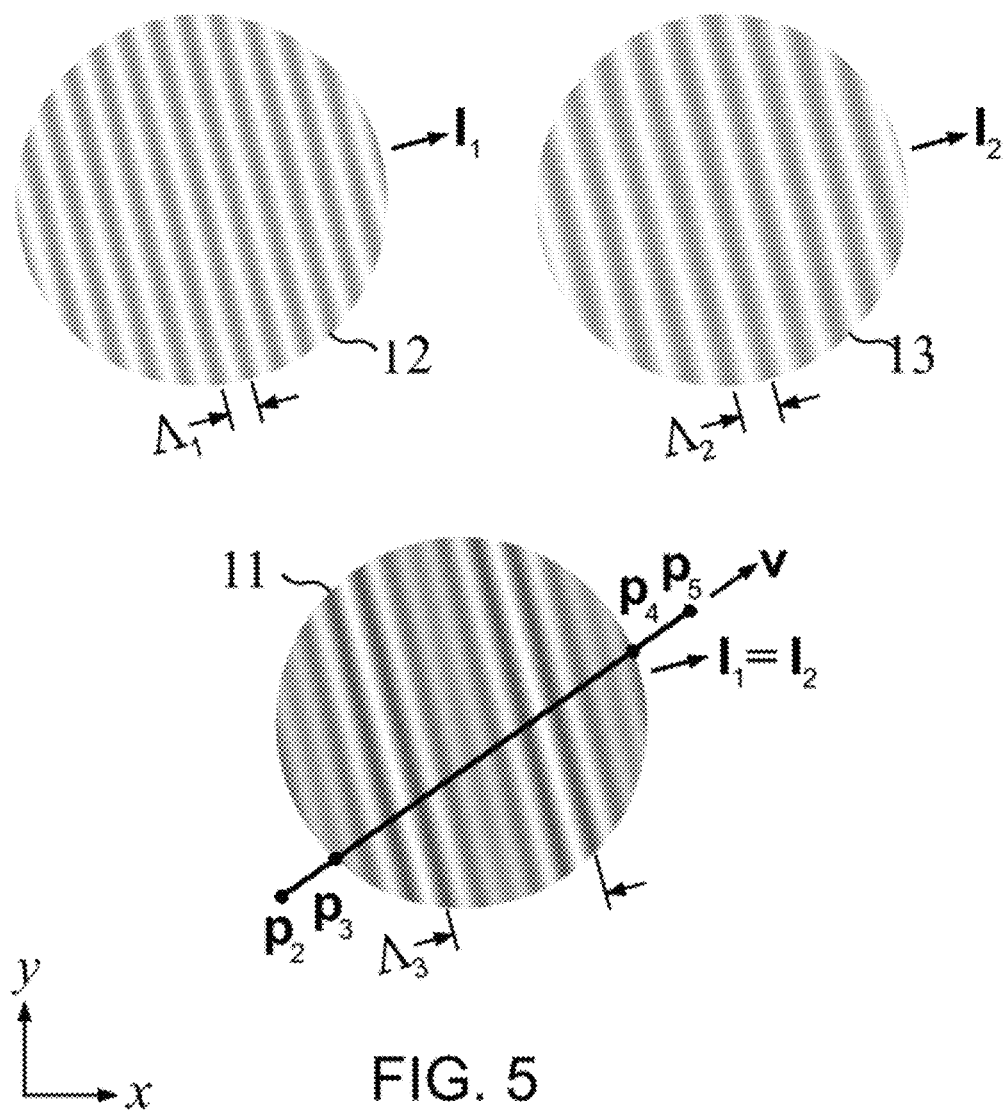
FIG. 5 has two patterns with different wavelengths, and a marker made by superposing them, with the path of a density sensor passing over the marker.

This is illustrated in FIG. 5, in which the pattern density function $F_3$ of marker 11 is the weighted sum of the density functions $F_1$ and $F_2$ of patterns 12 and 13, respectively. Specifically, for FIG. 5

$$F_3(x, y) = A(F_1(x, y) + 0.75 F_2(x, y)) + B, \quad (15)$$

where A and B are constants. The orientation vectors, $I_k$ for k=1, 2, and 3, are all rotated 15 degrees from the x-axis (so $I_1 = I_2 = I_3$). The direction-of-motion vector v is rotated 20 degrees from the orientation vectors, so the two path frequencies are $\omega_1 = \cos(20°)\Omega_1$ and $\omega_2 = \cos(20°)\Omega_2$ (see equaion (1)). Points $p_2, p_3, p_4,$ and $p_5$, are the same as in FIG. 1. FIG. 5 shows the wavelengths $\Lambda_1, \Lambda_2,$ and $\Lambda_3$ corresponding to $\Omega_1, \Omega_2,$ and $\Omega_3$, respectively; $\Omega_3 = (\Omega_1 - \Omega_2)/2$.

Figure 6:
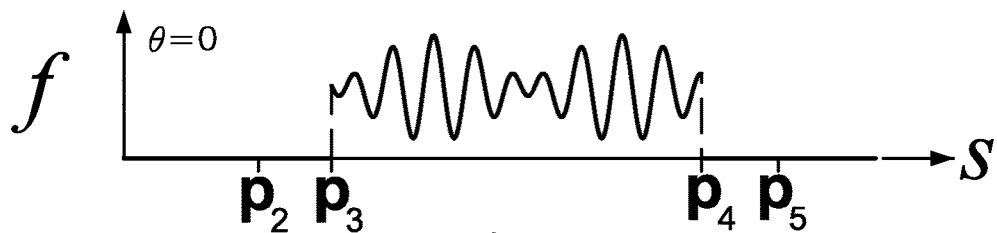
FIG. 6 shows the path-density function of a sensor passing over a marker comprising two superposed patterns of different wavelengths.
Figure 7:
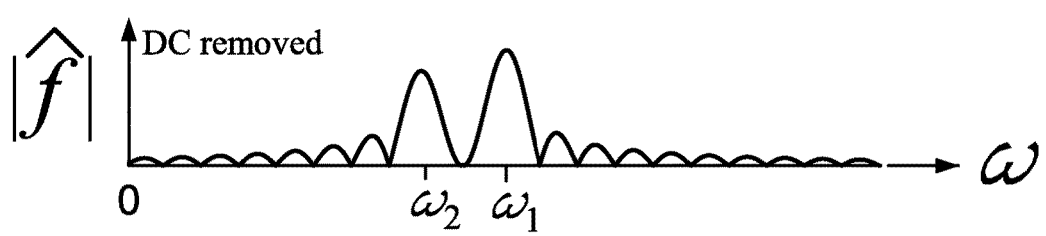
FIG. 7 displays the discrete Fourier transform (DFT) of the path-density function in FIG. 6.

The path-density function f of FIG. 5 and the absolute value |f̂| of its DFT are shown in FIG. 6 and FIG. 7. From the two peaks in FIG. 7 the computer can determine the frequencies $\omega_1$ and $\omega_2$, and the phases $\psi_1$ and $\psi_2$ of the two components of the path-density function.

This can be generalized to the superposition of L≥2 patterns with angular frequencies $\Omega_l$, and orientation vectors $I_l$ for l=1, 2, ..., L. Here it will be assumed that the $I_l$ are all equal.

There are L equations, one for each pattern, corresponding to equation (8):

$$\delta_l = (\tilde{p}_2 - C_l) \cdot I_l + (\phi_l - \psi_l - 2\pi m_l)/\Omega_l, \text{ for } l \in \{1, 2, \ldots, L\}, \quad (16)$$

where $0 \leq \psi_l < 2\pi$, and $m_l$ is an integer (there is only one $\delta_1$ because all $I_l = I_1$; all $I_l$ are shown, however). Combine these as follows. For $l \in \{1, 2, \ldots, L\}$ let $n_l$ be an integer. Multiply equation (16) by $n_l \Omega_l$, then add the equations together and rearrange the sum to get $$\delta_1 = \frac{1}{\sum_{l=1}^{L} n_l \Omega_l} \left( \sum_{l=1}^{L} (n_l(\Omega_l(\tilde{p}_2 - C_l) \cdot I_l + (\varphi_l - \psi_l))) - 2\pi \sum_{l=1}^{L} n_l m_l \right), \quad (17)$$

which can be rearranged into $$\sum_{l=1}^{L} n_l m_l = \sum_{l=1}^{L} \left( n_l \left( \frac{1}{\Lambda_l} (\tilde{p}_2 - C_l) \cdot I_l + \frac{1}{2\pi} (\varphi_l - \psi_l) \right) \right) - \delta_1 \sum_{l=1}^{L} \frac{n_l}{\Lambda_l}. \quad (18)$$

The left side of this is an integer, so if $$|\delta_1| < \frac{1}{2} \left| \sum_{l=1}^{L} \frac{n_l}{\Lambda_l} \right|^{-1} \quad (19)$$

then $$\sum_{l=1}^{L} n_l m_l = \text{Round}\left( \sum_{l=1}^{L} n_l \left( \frac{1}{\Lambda_l} (\tilde{p}_2 - C_l) \cdot I_l + \frac{1}{2\pi} (\varphi_l - \psi_l) \right) \right). \quad (20)$$

As before (see the text following equation (11)), after $\psi_l$ has been found for $l \in \{1, \ldots L\}$, if condition (19) is satisfied, the computer can get $\Sigma_{l=1}^{L} n_l m_l$, then $\delta_1$, and partially correct $\tilde{p}_2$ to $\tilde{p}_2 - \delta_1 I_0$.

Condition (19) is much better than the one ($|\delta_0| < \Lambda_0/2$) for a single pattern. For example, with L=2, $\Lambda_1 = \Lambda_0$, and $\Lambda_2 = \Lambda_1/0.8$, the values for FIGS. 5, 6, and 7, with $n_1 = 1$, if $n_2 = -1$, the right hand side of (19) is 2.5 $\Lambda_0$, which is 5 times larger than the other bound. With other choices of the frequencies it can be much larger.

The text after equation (11) applies mutatis mutandis to $\psi_l$, $\omega_l$, etc.

Figure 4:
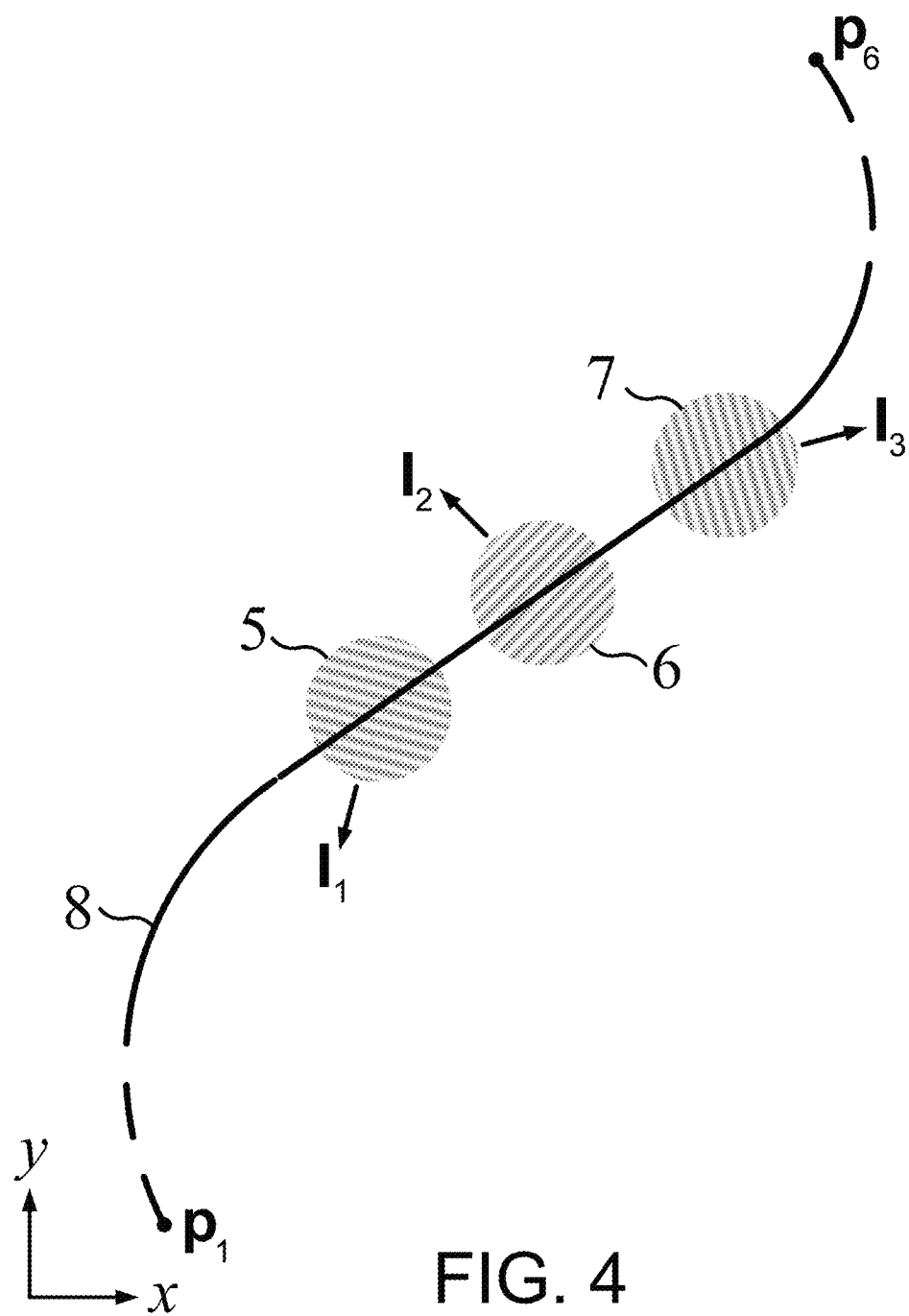
FIG. 4 shows the sensor path crossing three position markers with different orientations.
Figure 8:
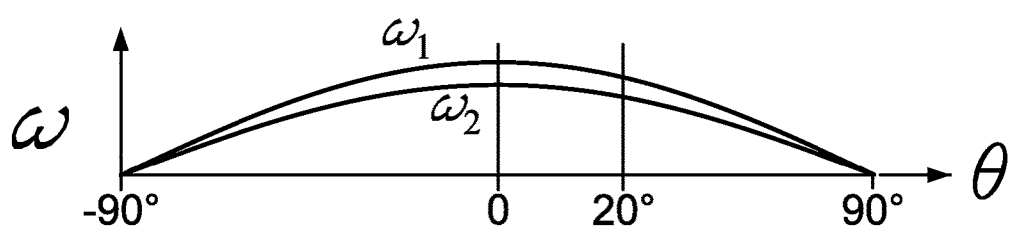
FIG. 8 exhibits the dependency of the frequencies on the direction of motion.

FIG. 8 shows how the path frequencies $\omega_1$ and $\omega_2$ change as the direction-of-motion vector v changes. Since $\omega_1$ and $\omega_2$ are periodic, the figure shows only one period. Near $\theta = 20°$ there is enough variation of the path frequencies that equation (1) with $\omega_0$ replaced by either $\omega_1$ or $\omega_2$ can be used for accurate correction of $\theta_0$, but that is not true at $\theta = 0°$ where $d\omega_1/d\theta = d\omega_2/d\theta = 0$. Another extreme is near $\theta = \pm 90°$, where $\omega_1$ and $\omega_2$ are so small that there is no useful information about $\theta_0$ (as is the case with position marker 6 in FIG. 4). This kind of graph will be seen again in the following.

3. Superposing Unaligned Patterns

Consider a marker which is the same as that of FIG. 5 except that patterns 12 and 13 are rotated so that, say, $\alpha_1 = 15°$ (i.e., 12 is unchanged) and $\alpha_2 = 60°$. Then the two patterns provide information about coordinate errors in two different directions, so the coordinates can be corrected completely.

Figure 9:
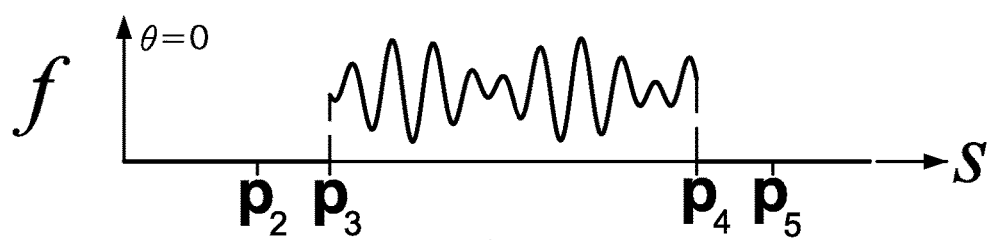
FIG. 9 shows the path-density function of a sensor passing over a marker comprising two superposed patterns of different wavelengths and different orientations.
Figure 10:
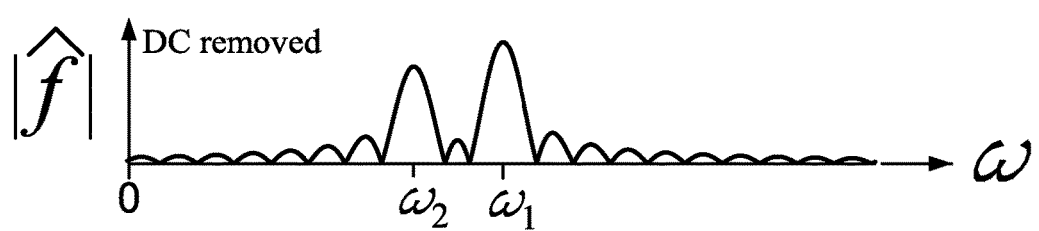
FIG. 10 displays the DFT of the path-density function in FIG. 9.
Figure 11:
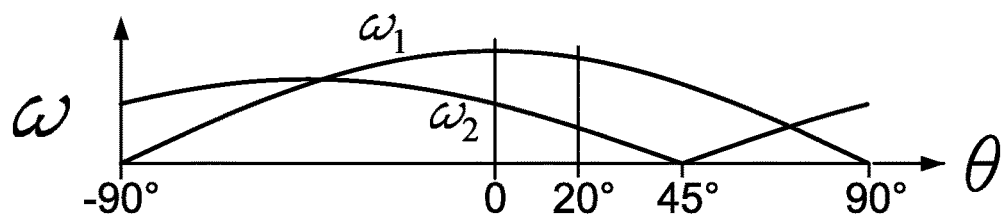
FIG. 11 exhibits the dependency of the path-density-function frequencies on the direction of motion for a marker of two patterns with different wavelengths and different orientations.

FIG. 9 and FIG. 10 show the path-density function f and the absolute value $|\hat{f}|$ of its DFT, respectively, for this arrangement. The peaks of $|\hat{f}|$ are somewhat farther apart than those of FIG. 7. FIG. 11 shows how the wavelengths $\omega_1$ and $\omega_2$ change as the angle-of-motion $\theta$ changes.

Consider a marker with $L \geq 2$ pattern axes. For each $l \in \{1, \ldots, L\}$, the displacement vector $\delta = \tilde{p}_2 - p_2$ has a component $\delta_l = \delta \cdot I_l$ along $I_l$. Given $\delta_l$ for all $l \in 1, \ldots, L$, $\delta$ can be found by taking $\delta = \Sigma_{l=1}^{L} a_l I_l$ and solving the simultaneous linear equations $$\delta_l = \delta \cdot I_l, \text{ for } l \in \{1, \ldots, L\}. \quad (21)$$

for $a_1, \ldots, a_L$.

FIG. 12 shows the geometrical relationships for two pattern axes, but omits the marker pattern, which is represented by its boundary circle 31. Line 32 is the sensor path. The pattern axes are line 33 for the axis associated with $I_l$, and line 34 for the axis associated with $I_i$. The orientation vectors $I_l$ and $I_i$ are at angles $\alpha_l$ and $\alpha_i$ from the positive x-axis, respectively. The angles from $I_l$ and $I_i$ to the direction-of-motion vector v are $\theta_l$ and $\theta_i$, respectively; for purposes of illustration, $\theta_i$ is shown as negative, but all calculations assume that both $\theta_l$ and $\theta_i$ are in [0, $2\pi$).

For FIGS. 9, 10, and 11 the pattern for each of $I_1$ and $I_2$ is sinusoidal with a single frequency. As was noted earlier, this severely restricts the size of the displacement.

Instead, in the following, each pattern axis $I_l$ has $K_l \geq 1$ associated patterns. For each $k \in \{1, \ldots, K_l\}$ the pattern has reference point $C_{lk}$, angular frequency $\Omega_{lk}$, phase $\psi_{lk}$ at $C_{lk}$, and corresponding path frequency $\omega_{lk}$; and for each of these patterns there is an equation like equation (16) for $\delta_l = (\tilde{p}_2 - p_2) \cdot I_l$, the displacement in the direction of $I_l$. Let $J_l$ be the unit vector orthogonal to $I_l$ and pointing to the left of $I_l$. Then there are numbers $a_{li}$ and $b_{li}$ such that $I_i = a_{li} I_l + b_{li} J_l$. Note that $a_{ll} = 1$ and $b_{ll} = 0$. FIG. 12 shows vectors $J_i$ and $J_l$.

There are integers $m_{ik}$ such that equation (7) mutatis mutandis becomes $$\Omega_{ik}(p_2 - C_{ik}) \cdot I_i = -\phi_{ik} + \psi_{ik} + 2\pi m_{ik} \text{ for } i \in \{1, 2, \ldots, L\} \quad (22)$$
$$\text{and } k \in \{1, 2, \ldots, K_i\}.$$

Since $$(p_2 - C_{ik}) \cdot I_i = (p_2 - \tilde{p}_2 + \tilde{p}_2 - C_{ik}) \cdot I_i = -\delta \cdot (a_{li} I_l + b_{li} J_l) + (\tilde{p}_2 - C_{ik}) \cdot I_i$$
$$= -a_{li} \delta_l - b_{li} \delta \cdot J_l + (\tilde{p}_2 - C_{ik}) \cdot I_i$$

equation (22) can be rewritten as $$\delta_l \frac{\Omega_{ik} a_{li}}{2\pi} = \frac{\Omega_{ik}}{2\pi} ((\tilde{p}_2 - C_{ik}) \cdot I_i - b_{li} \delta \cdot J_l) + \frac{1}{2\pi} (\varphi_{ik} - \psi_{ik}) - m_{ik} \quad (23)$$

$$\text{for } i \in \{1, 2, \ldots, L\}, k \in \{1, 2, \ldots, K_i\}, l \in \{1, 2, \ldots, L\}$$

$$\text{and } a_{li} \neq 0$$

(omit any of these equations with $a_{li} = 0$).

Combine all of these equations to get a single equation for $\delta_l$: choose integers $n_{lik}$, multiply the equation by them, and sum on i and k to get $$\delta_l \sum_{\substack{i=1 \\ a_{li} \neq 0}}^{L} \sum_{k=1}^{K_i} \frac{n_{lik} \Omega_{ik} a_{li}}{2\pi} = \quad (24)$$

$$\sum_{\substack{i=1 \\ a_{li} \neq 0}}^{L} \sum_{k=1}^{K_i} \frac{n_{lik} \Omega_{ik}}{2\pi} ((\tilde{p}_2 - C_{ik}) \cdot I_i - b_{li} \delta \cdot J_l) + \sum_{\substack{i=1 \\ a_{li} \neq 0}}^{L} \sum_{k=1}^{K_i} \frac{n_{lik}}{2\pi} (\varphi_{ik} - \psi_{ik}) -$$

$$\sum_{\substack{i=1 \\ a_{li} \neq 0}}^{L} \sum_{k=1}^{K_i} n_{lik} m_{ik} \text{ for } l \in \{1, 2, \ldots, L\}.$$

If the last term can be computed, this can be solved for $\delta_l$. As before, since the last term is an integer, for each $l \in \{1, 2, \ldots, L\}$ $$\sum_{\substack{i=1 \\ a_{li} \neq 0}}^{L} \sum_{k=1}^{K_i} n_{lik} m_{ik} = \quad (25)$$

$$\text{Round}\left(\sum_{\substack{i=1 \\ a_{li} \neq 0}}^{L} \sum_{k=1}^{K_i} \frac{n_{lik} \Omega_{ik}}{2\pi}\left((\tilde{p}_2 - C_{ik}) \cdot I_i + \frac{n_{lik}}{2\pi}(\varphi_{ik} - \psi_{ik})\right)\right),$$

provided $$\left|\delta_l \sum_{\substack{i=1 \\ a_{li} \neq 0}}^{L} \sum_{k=1}^{K_i} \frac{n_{lik} \Omega_{ik} a_{li}}{2\pi} + \delta \cdot J_l \sum_{\substack{i=1 \\ a_{li} \neq 0}}^{L} \sum_{k=1}^{K_i} \frac{n_{lik} \Omega_{ik}}{2\pi} b_{li}\right| < \frac{1}{2}. \quad (26)$$

It is sufficient to make $$|\delta_l| < \frac{\pi}{2}\left|\sum_{\substack{i=1 \\ a_{li} \neq 0}}^{L} \sum_{k=1}^{K_i} n_{lik} \Omega_{ik} a_{li}\right|^{-1} \text{ and } |\delta| < \frac{\pi}{2}\left|\sum_{\substack{i=1 \\ a_{li} \neq 0}}^{L} \sum_{k=1}^{K_i} n_{lik} \Omega_{ik} b_{li}\right|^{-1}.$$

In summary, under the assumption in equation (26), for each the computer can use equation (25) to get $$\sum_{i=1}^{L} \sum_{k=1}^{K_i} n_{lik} m_{lk},$$

use that in equation (24) to get $\delta_l$, use $\delta_l$ in equation (21) to get the vector displacement $\delta$, then subtract $\delta$ from $\tilde{p}_2$ to get a new estimate of $p_2$.

Usually, the number $\Sigma_{i=1}^L K_i$ of patterns is greater than two, and the peaks of the function $|\hat{f}|$ must be associated with the corresponding pattern. This can be done if the patterns have unique amplitudes so the computer can associate each pattern with the peak of corresponding size.

Markers for particular applications can be designed by varying the number of pattern axes, the number of patterns for each axis, the pattern frequencies, and the directions of the pattern orientation vectors. The integers $n_{lik}$ can be chosen to provide the best range for $\delta$.

4. Using High-Contrast Media

The discussion above assumed that the marker density can take on all possible values over some range. This allowed the marker-density function F to be the sum of several cosine functions. That is not possible for high-contrast media which have only few density values.

Consider a medium that can only be black or white. In this case, patterns can be represented by marker-density functions F, $F_1$, $F_2$, . . . having only the values 0 and 1, say 0 for white, and 1 for black. The function F cannot be formed by weighted addition of the pattern density functions $F_1$, $F_2$, . . . , but it can be formed by multiplying them. Periodic functions of this type can be represented by Fourier series. Multiplication of the functions produece complicated combinations of the sinusoidal components, but analysis of the path-density function can still provide phase and frequency information needed for correction of navigation parameters. For two patterns, if $$F_k(s) = \frac{1}{2} + \sum_{\substack{m=-\infty \\ m \neq 0}}^{\infty} c_{km} e^{j\omega_k m s}, \quad (27)$$

where $c_{km}$ is a complex constant, then $$F_1(s)F_2(s) = \frac{1}{4} + \frac{1}{2}(c_{1,-1}e^{-j\omega_1 s} + c_{11}e^{j\omega_1 s} + c_{2,-1}e^{-j\omega_2 s} + c_{21}e^{j\omega_2 s}) + \quad (28)$$

terms with higher fequencies, so the low frequency terms are separated and can be found using the DFT. This can be extended to more than two patterns. The functions on the left of this equation can be raised to different powers to weight the functions.

5. Other Considerations

Pattern density functions are periodic, but they need not be sinusoidal. Since periodic functions can be represented as a Fourier series like that of equation (27), the technique described for high-contrast media can be adapted for patterns which are not sinusoidal.

Figure 2:
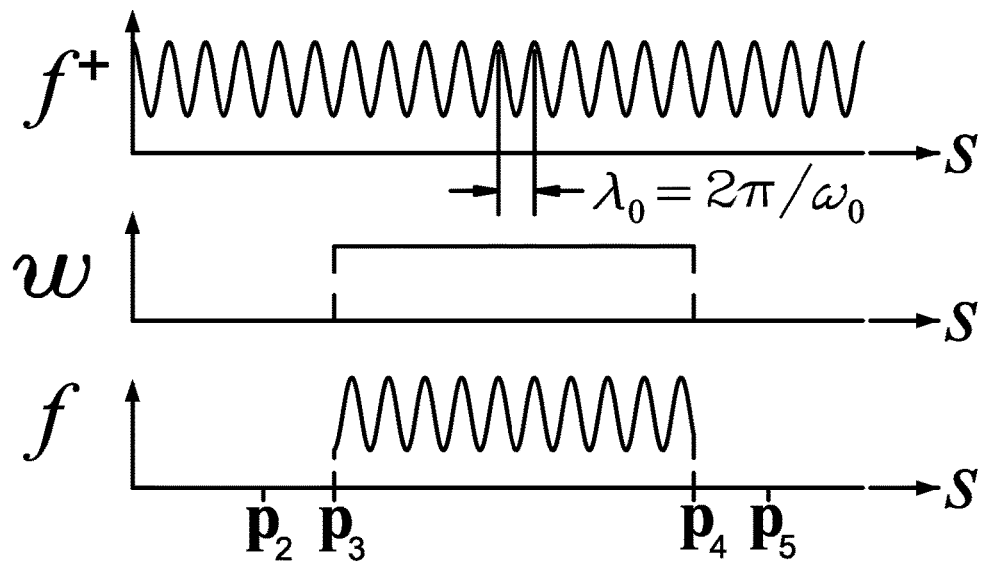
FIG. 2 displays the path-density function and some related functions.
Figure 3:
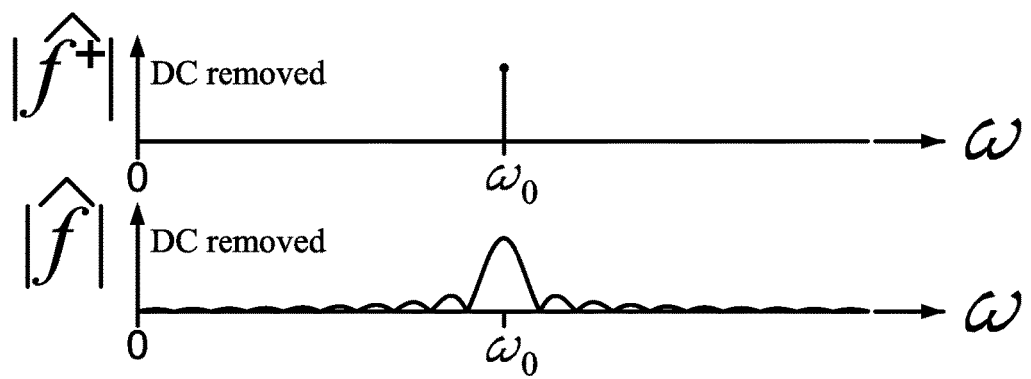
FIG. 3 displays discrete Fourier transforms (DFTs) of some functions in FIG. 3.

It is well known that window functions ω other than the one shown in FIG. 2 can be used to reduce the level of $|\hat{f}|$ outside the central peaks. While such windows can be used to taper the edge of a marker, it is better and more flexible to have the computer apply windows in the processing of the path-density function f.

Persons knowledgeable of the relevant art will recognize that markers need not be circular disks, so that other regions can be used.

Although it is not clear how one could construct markers for three (or higher) dimensional applications, equations (23) through (26), which were derived for two-dimensional markers, also apply to markers of higher dimensions comprising superposed periodic patterns.

The invention claimed is:

1. An automatic system for determining a position and direction-of-motion of a vehicle, which system comprises
    set of position markers fixed in known positions,
    a density sensor mounted on the vehicle and positioned so it determines density along a line as the vehicle moves,
    a computer receiving density values determined by the density sensor, and maintaining an estimate of the position and direction-of-motion of the vehicle, and
    a computer control system that directs the computer to perform computations for estimating the position and direction-of-motion of the vehicle from the density values as the sensor passes across any one of the position markers;
    each of the position markers comprising one or more density patterns in a finite two-dimensional region;
    each of the density patterns filling a two-dimensional region of a position marker;
    each of the density patterns having a known orientation vector;
    in the two-dimensional region, a density of each density pattern being a known periodic function of position in a direction of its orientation vector, and independent of position in a direction orthogonal to its orientation vector;

at each point of the two-dimensional region the position marker having a density which is a combination of its density-pattern densities at the same point;

the computer storing the density values it receives as a path density function until it determines that it has a quantity of them that is sufficient for performing the computations needed to estimate a current position and direction-of-motion of the vehicle;

the computer then performing mathematical operations necessary to determine frequency, phase, and amplitude values of various sinusoidal components of the path density function;

the computer then using so-determined amplitude value of each sinusoidal component of the path density function to determine which density pattern corresponds to that sinusoidal component;

the computer then performing mathematical operations necessary to use so-determined frequency and phase values of sinusoidal components of the path density function and spatial frequency and phase values of corresponding known density patterns of position markers to determine the vehicle's direction-of-motion and an offset of a current estimate of the vehicle's position from a vehicle's actual position, and then using that offset to correct the current estimate of the vehicle's position.

2. A system as in claim 1 for which a density-determining periodic function of a density pattern is a sinusoid.

3. A system as in claim 1 for which
at each point of the two-dimensional region the position marker has a density which is a constant plus a weighted sum of its density-pattern densities at the same point.

4. A system as in claim 1 for which
the density of each of the density patterns is between zero and one;
and at each point of the two-dimensional region the position marker has a density which is a multiplicative product of the densities of the density patterns at the same point,
with adjustment of a range of densities.

5. A system as in claim 1 for which
a set of position markers are positioned so the density sensor passes over them sequentially.

6. A system as in claim 1 for which
the frequencies, phases, and amplitudes of the sinusoidal components of the computer-stored path-density function are determined by using the Discrete Fourier Transform.

* * * * *